US010083685B2

(12) United States Patent
Zhao et al.

(10) Patent No.: US 10,083,685 B2
(45) Date of Patent: Sep. 25, 2018

(54) DYNAMICALLY ADDING OR REMOVING FUNCTIONALITY TO SPEECH RECOGNITION SYSTEMS

(71) Applicant: GM Global Technology Operations LLC, Detroit, MI (US)

(72) Inventors: Xu Fang Zhao, Windsor (CA); Md Foezur Rahman Chowdhury, Troy, MI (US); Gaurav Talwar, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/881,334

(22) Filed: Oct. 13, 2015

(65) Prior Publication Data

US 2017/0103749 A1 Apr. 13, 2017

(51) Int. Cl.

| | |
|---|---|
| ***G10L 21/00*** | (2013.01) |
| ***G10L 25/00*** | (2013.01) |
| ***G10L 15/00*** | (2013.01) |
| ***G10L 15/26*** | (2006.01) |
| ***G10L 17/00*** | (2013.01) |
| ***G10L 13/00*** | (2006.01) |
| ***G10L 13/08*** | (2013.01) |
| ***G10L 15/18*** | (2013.01) |
| ***G10L 15/04*** | (2013.01) |
| ***G10L 19/00*** | (2013.01) |
| ***G10L 15/06*** | (2013.01) |
| ***G06F 3/033*** | (2013.01) |
| ***G06F 3/048*** | (2013.01) |
| ***H04M 1/00*** | (2006.01) |
| ***H04B 1/38*** | (2015.01) |
| ***H04W 4/00*** | (2018.01) |
| ***G06F 17/27*** | (2006.01) |
| ***G06F 17/21*** | (2006.01) |
| ***G06F 17/20*** | (2006.01) |
| ***G06F 17/28*** | (2006.01) |

(Continued)

(52) U.S. Cl.

CPC .............. *G10L 15/07* (2013.01); *G10L 15/08* (2013.01); *G10L 15/22* (2013.01); *G10L 2015/088* (2013.01); *G10L 2015/223* (2013.01)

(58) Field of Classification Search

CPC ..... G10L 15/265; G10L 15/22; G10L 15/187; G10L 13/08; G10L 17/005; G10L 19/0212; G06F 9/4448; G06F 17/2785; G06F 17/2735

See application file for complete search history.

(56) References Cited

U.S. PATENT DOCUMENTS 6,654,720 B1 * 11/2003 Graham .................... G06F 3/16 704/270

7,200,555 B1 * 4/2007 Ballard .................. G10L 15/22 704/235

(Continued)

*Primary Examiner* — Anne L Thomas-Homescu

(74) *Attorney, Agent, or Firm* — David Willoughby; Reising Ethington P.C.

(57) ABSTRACT

A system and method of changing features of an existing automatic speech recognition (ASR) system includes: monitoring speech received from a vehicle occupant for one or more keywords identifying a feature to remove from or add to the ASR system; detecting the keywords in the monitored speech; and adding the identified feature to or removing the identified feature from from the ASR system.

17 Claims, 3 Drawing Sheets

300

Start

310 Receiving a Feature to Add or Subtract from an ASR System

320 Establishing a Database of Keywords that Identify the Feature

330 Received Speech Include a Keyword?

No

340 Sending Speech to Speech Recognition Decoder

Yes

350 Adding or Removing the Feature

End

(51) Int. Cl.
*G10L 15/07* (2013.01)
*G10L 15/08* (2006.01)
*G10L 15/22* (2006.01)

(56) References Cited

U.S. PATENT DOCUMENTS 9,240,077 B1 * 1/2016 Kraft .................... G06T 19/006
2002/0007278 A1 * 1/2002 Traynor ................. G10L 15/26 704/275
2002/0072896 A1 * 6/2002 Roberge ............... G06F 3/0482 704/10
2003/0083079 A1 * 5/2003 Clark .............. G08G 1/096716 455/466
2004/0006469 A1 * 1/2004 Kang ................... G10L 15/187 704/254
2005/0288842 A1 * 12/2005 Brewer ............... B60G 17/018 701/70
2006/0155547 A1 * 7/2006 Browne ................. G10L 15/26 704/275
2007/0082706 A1 * 4/2007 Campbell .......... B60R 16/0373 455/563
2007/0118353 A1 * 5/2007 Cho ................... G06F 17/2775 704/3
2008/0103779 A1 * 5/2008 Huang ................... G10L 15/28 704/275
2008/0189110 A1 * 8/2008 Freeman ........... G06Q 30/0241 704/251
2009/0011799 A1 * 1/2009 Douthitt ............. H04M 1/6091 455/569.1
2009/0076798 A1 * 3/2009 Oh ...................... G06F 17/279 704/9
2009/0083035 A1 * 3/2009 Huang ................... G10L 13/08 704/260
2009/0089065 A1 * 4/2009 Buck .................. B60R 16/0373 704/275
2009/0192794 A1 * 7/2009 Akamatsu .............. G10L 25/48 704/230
2009/0245533 A1 * 10/2009 Gerlach ............. H04M 1/6083 381/86
2009/0254335 A1 * 10/2009 Bruckner ............. G10L 15/065 704/8
2009/0309713 A1 * 12/2009 Baruco ................ B60R 25/257 340/12.3
2009/0326813 A1 * 12/2009 Miller ................... G07C 5/085 701/532
2009/0326949 A1 * 12/2009 Douthitt ........... G06F 17/30038 704/260
2010/0026815 A1 * 2/2010 Yamamoto ............ G03B 17/00 348/207.1
2010/0250243 A1 * 9/2010 Schalk ................... G10L 15/22 704/201
2010/0324899 A1 * 12/2010 Yamabana ............. G10L 15/07 704/251
2011/0119062 A1 * 5/2011 Dohan .................... B60Q 1/34 704/275
2011/0131037 A1 * 6/2011 Huang ............... B60R 16/0373 704/10
2011/0172562 A1 * 7/2011 Sahasrabudhe ...... A61B 5/0476 600/587
2011/0172989 A1 * 7/2011 Moraes ............... G06Q 10/107 704/9
2011/0307250 A1 * 12/2011 Sims ...................... G10L 15/22 704/231
2012/0166203 A1 * 6/2012 Fuchs .................. G06F 19/325 704/275
2012/0265536 A1 * 10/2012 Paik ....................... G10L 15/22 704/270
2013/0014039 A1 * 1/2013 Lachenmann ........... G06F 8/38 715/765
2013/0085755 A1 * 4/2013 Bringert ................. G10L 15/28 704/235
2013/0197753 A1 * 8/2013 Daly ........................ G06F 7/00 701/36
2014/0278416 A1 * 9/2014 Schuster ................ G10L 17/00 704/246
2014/0282269 A1 * 9/2014 Strutt ................. G06F 3/04886 715/863
2014/0379334 A1 * 12/2014 Fry ........................ G10L 15/22 704/235
2015/0006182 A1 * 1/2015 Schmidt ................. G10L 15/30 704/275
2015/0106096 A1 * 4/2015 Toopran ............... G10L 15/193 704/244
2015/0243288 A1 * 8/2015 Katsuranis ........... G06F 3/0484 704/275
2015/0264175 A1 * 9/2015 Bumarch, III ...... H04M 3/4936 379/88.01
2015/0302001 A1 * 10/2015 Walther ................. G10L 13/04 704/9
2015/0348543 A1 * 12/2015 Zhao ...................... G10L 15/19 704/257
2015/0379987 A1 * 12/2015 Panainte ................. H04R 1/08 704/246
2016/0027436 A1 * 1/2016 Lee ........................ G10L 15/22 704/236
2016/0027437 A1 * 1/2016 Hong .................... G10L 15/187 704/254
2016/0098992 A1 * 4/2016 Renard .................. G10L 15/24 704/275
2016/0118048 A1 * 4/2016 Heide ..................... G10L 15/22 704/275
2016/0176372 A1 * 6/2016 Kim .......................... B60J 1/00 701/49
2016/0335051 A1 * 11/2016 Osawa .................... G10L 15/22
2016/0379629 A1 * 12/2016 Hofer ...................... G10L 15/22
2017/0092295 A1 * 3/2017 Talwar .................... G10L 15/04

* cited by examiner 210
52 / 54
Post-Processor
216
Grammar(s) / Lexicon Model(s)
218
Decoder / Classifier
214
Sentence / Language Model(s)
224
Acoustic Model(s)
220
Word Model(s)
222
Feature Vectors
32
Acoustic Language Sound A to D
33
215
Pre-Processor
212
Other Audio Source(s)
31

DYNAMICALLY ADDING OR REMOVING FUNCTIONALITY TO SPEECH RECOGNITION SYSTEMS

TECHNICAL FIELD

The present invention relates to automatic speech recognition systems and, more particularly, to adding or removing functionality to the speech recognition systems.

BACKGROUND

Vehicle manufacturers currently equip vehicles with speech recognition functionality that allows vehicle occupants to vocalize commands that the vehicle can interpret and respond to. Generally speaking, speech recognition systems can be located at a vehicle such that an in-vehicle microphone receives speech, the speech recognition system processes the speech to determine its content, and outputs a text representation of that content.

Sometimes, the vehicle manufacturer may specify what functions the speech recognition system provides and a third party designs and builds the speech recognition system for the vehicle manufacturer. The vehicle manufacturer can then receive the speech recognition system from the third party and install it in the vehicles the vehicle manufacturer produces. But changing the functionality of speech recognition systems provided by a third party can be complex. If the vehicle manufacturer would like to change the functionality or features offered by the speech recognition system, the vehicle manufacturer may have to document these changes and send them to the third party who then re-trains and/or re-programs the speech recognition system at significant expense and complexity. And even then the vehicle manufacturer may not be able to apply those changes to previously-manufactured vehicles. It would be helpful if the vehicle manufacturer could quickly modify speech recognition systems provided by third parties without assistance from the third parties.

SUMMARY

According to an embodiment of the invention, there is provided a method of changing features of an existing automatic speech recognition (ASR) system. The method includes monitoring speech received from a vehicle occupant for one or more keywords identifying a feature to remove from the ASR system; detecting the one or more keywords in the monitored speech; and removing the feature from the ASR system.

According to another embodiment of the invention, there is provided a method of changing features of an existing automatic speech recognition (ASR) system. The method includes monitoring speech received from a vehicle occupant for one or more keywords identifying a feature to add to the ASR system; detecting the one or more keywords in the monitored speech; adding the feature to the ASR system; and generating a speech recognition output at a pre-processor software module of the ASR system.

According to yet another embodiment of the invention, there is provided a method of changing features of an existing automatic speech recognition (ASR) system. The method includes receiving, at a vehicle, a feature to add to or remove from the ASR system; establishing, at the vehicle, a database of keywords that identify the feature; monitoring speech received from a vehicle occupant for one or more of the keywords; detecting one or more keywords in the monitored speech; and adding or removing the feature from the ASR system at a pre-processor software module or a post-processor software module.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The system and method described below modifies the features or functionality of an existing automatic speech recognition (ASR) system provided by a third party. These ASR systems can be configured to provide a defined number of features that conform to or match the features also available at the vehicle. Features or functionality provided by the ASR system involve a vehicle function or service that the vehicle occupant can control using vocalized commands. For example, navigational directions, radio controls, in-vehicle calling, and multimedia—such as an email client for composing email—are all examples of different features that can be controlled by the vehicle occupant. The features available at the ASR system can be configured to match the ability of a vehicle to provide those features. That is, if the vehicle does not offer a particular feature, such as navigational directions, the existing ASR system may be designed in a way that it does not provide speech recognition services for commands involving navigation.

But a vehicle's ability to provide features can change. It is possible that the vehicle manufacturer would like to begin producing vehicles that offer turn-by-turn navigation whereas the vehicles were not previously equipped with existing ASR systems offering such a feature. Or a vehicle that once did not offer in-vehicle calling can later be configured to do so. In the past, the vehicle manufacturer would ask the third party who designed or produced the existing ASR system to incorporate the newly-added features. This process would not be able to retroactively add or remove the desired features to previously-manufactured vehicles and it would only be able to add/remove functionality to vehicles produced in the future at significant effort and expense incurred by the third party.

In the system and method described, the existing ASR system can be modified by adding features to or removing features from the existing functionality or features at the pre-processing or post-processing modules of the ASR system. The features can then be modularly added to or removed from the existing ASR system. If changes are made to the pre-processing module, features can be either added or removed and when changes are made to the post-processing module, features can be removed. By permitting the vehicle manufacturer to control the addition or removal of features from a third-party ASR system, it is possible to more quickly change the functionality of the ASR system without contacting the third party or otherwise retraining the entire ASR system to include the desired functionality or features.

Further, the vehicle manufacturer can add to or remove features from the ASR system even after the vehicle has been manufactured and do so remotely via wireless communications between the vehicle and a central facility using the present system.

Communications System—

Figure 1:
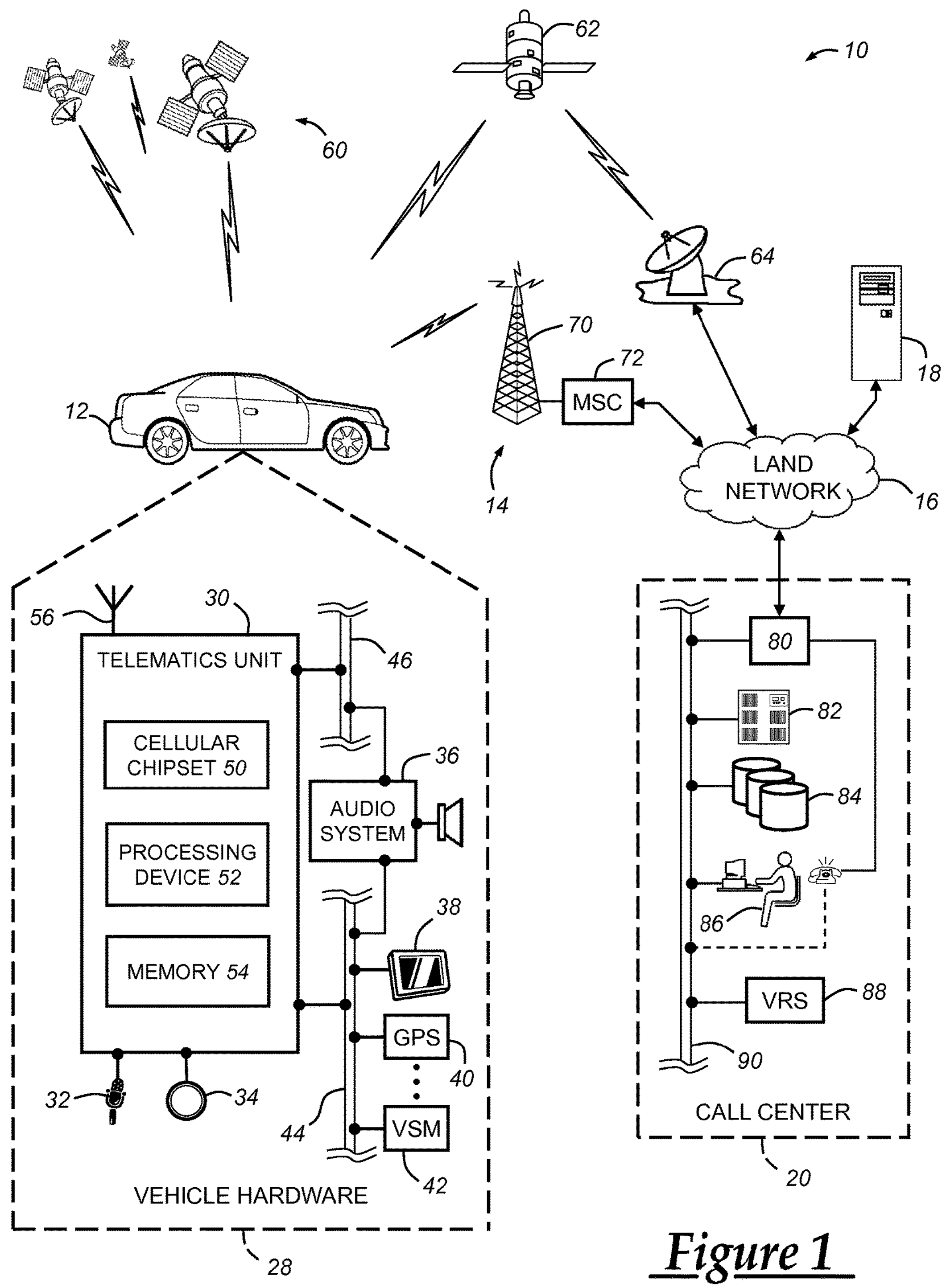
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
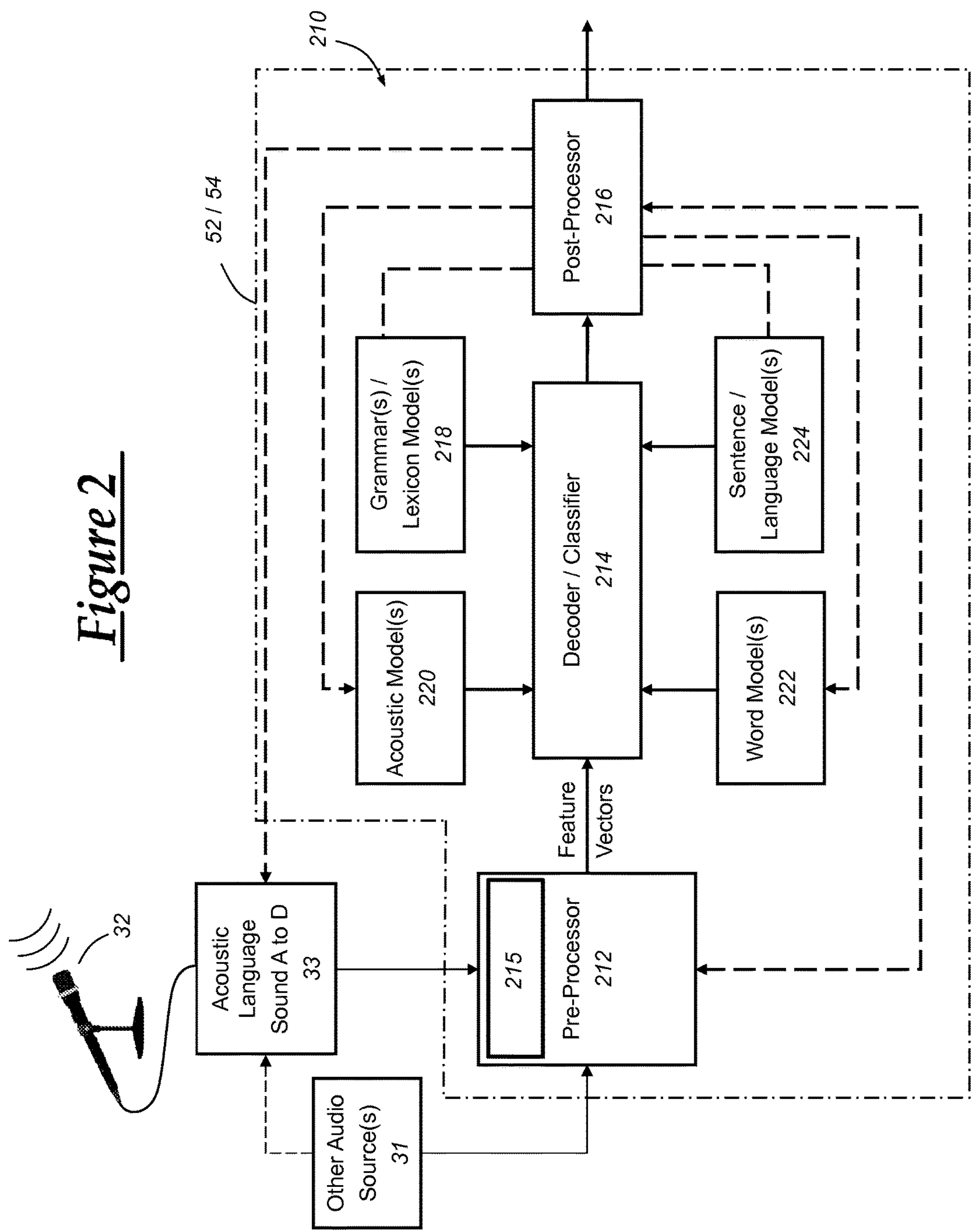
FIG. 2 is a block diagram depicting an embodiment of an automatic speech recognition (ASR) system.

Turning now to FIG. 2, there is shown an illustrative architecture for an ASR system 210 that can be used to enable the presently disclosed method. In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 2 illustrates just one specific illustrative ASR system 210. The ASR system 210 can also be referred to as an existing ASR system, which generally involves an ASR system designed and/or manufactured by someone other than a vehicle manufacturer or a third party such that changes to the ASR system involve at least some participation from the other entity or third party. The system 210 includes a device to receive speech such as the telematics microphone 32, and an acoustic interface 33 such as a sound card of the telematics unit 30 having an analog to digital converter to digitize the speech into acoustic data. The system 210 also includes a memory such as the telematics memory 54 for storing the acoustic data and storing speech recognition software and databases, and a processor such as the telematics processor 52 to process the acoustic data. The processor functions with the memory and in conjunction with the following modules: one or more front-end processors or pre-processor software modules 212 for parsing streams of the acoustic data of the speech into parametric representations such as acoustic features; one or more decoder software modules 214 for decoding the acoustic features to yield digital subword or word output data corresponding to the input speech utterances; and one or more post-processor software modules 216 for using the output data from the decoder module(s) 214 for any suitable purpose.

The system 210 can also receive speech from any other suitable audio source(s) 31, which can be directly communicated with the pre-processor software module(s) 212 as shown in solid line or indirectly communicated therewith via the acoustic interface 33. The audio source(s) 31 can include, for example, a telephonic source of audio such as a voice mail system, or other telephonic services of any kind.

One or more modules or models can be used as input to the decoder module(s) 214. First, grammar and/or lexicon model(s) 218 can provide rules governing which words can logically follow other words to form valid sentences. In a broad sense, a grammar can define a universe of vocabulary the system 210 expects at any given time in any given ASR mode. For example, if the system 210 is in a training mode for training commands, then the grammar model(s) 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 assist with selection of most likely subwords or words corresponding to input from the pre-processor module(s) 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative illustrative embodiment, some or all of the ASR system 210 can be resident on, and processed using, computing equipment in a location remote from the vehicle 12 such as the call center 20. For example, grammar models, acoustic models, and the like can be stored in memory of one of the servers 82 and/or databases 84 in the call center 20 and communicated to the vehicle telematics unit 30 for in-vehicle speech processing. Similarly, speech recognition software can be processed using processors of one of the servers 82 in the call center 20. In other words, the ASR system 210 can be resident in the telematics unit 30, distributed across the call center 20 and the vehicle 12 in any desired manner, and/or resident at the call center 20.

First, acoustic data is extracted from human speech wherein a vehicle occupant speaks into the microphone 32, which converts the utterances into electrical signals and communicates such signals to the acoustic interface 33. A sound-responsive element in the microphone 32 captures the occupant's speech utterances as variations in air pressure and converts the utterances into corresponding variations of analog electrical signals such as direct current or voltage. The acoustic interface 33 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 33 converts the analog electrical signals into digital electronic signals. The digital data are binary bits which are buffered in the telematics memory 54 and then processed by the telematics processor 52 or can be processed as they are initially received by the processor 52 in real-time.

Second, the pre-processor module(s) 212 transforms the continuous stream of digital speech data into discrete sequences of acoustic parameters. More specifically, the processor 52 executes the pre-processor module(s) 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module(s) 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module(s) 214 to process the incoming feature vectors of each test pattern. The decoder module(s) 214 is also known as a recognition engine or classifier, and uses stored known reference patterns of speech. Like the test patterns, the reference patterns are defined as a concatenation of related acoustic frames and corresponding parameters. The decoder module(s) 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest.

In a similar manner, individual HMMs for a sequence of subwords can be concatenated to establish single or multiple word HMM. Thereafter, an N-best list of single or multiple word reference patterns and associated parameter values may be generated and further evaluated.

In one example, the speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Illustrative parameter values can include confidence scores of each reference pattern in the N-best list of vocabulary and associated segment durations, likelihood scores, signal-to-noise ratio (SNR) values, and/or the like.

The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module(s) 216 receives the output data from the decoder module(s) 214 for any suitable purpose. In one example, the post-processor software module(s) 216 can identify or select one of the reference patterns from the N-best list of single or multiple word reference patterns as recognized speech. In another example, the post-processor module(s) 216 can be used to convert acoustic data into text or digits for use with other aspects of the ASR system or other vehicle systems. In a further example, the post-processor module(s) 216 can be used to provide training feedback to the decoder 214 or pre-processor 212. More specifically, the post-processor 216 can be used to train acoustic models for the decoder module(s) 214, or to train adaptation parameters for the pre-processor module(s) 212.

The method or parts thereof can be implemented in a computer program product embodied in a computer readable medium and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Method—

Figure 3:
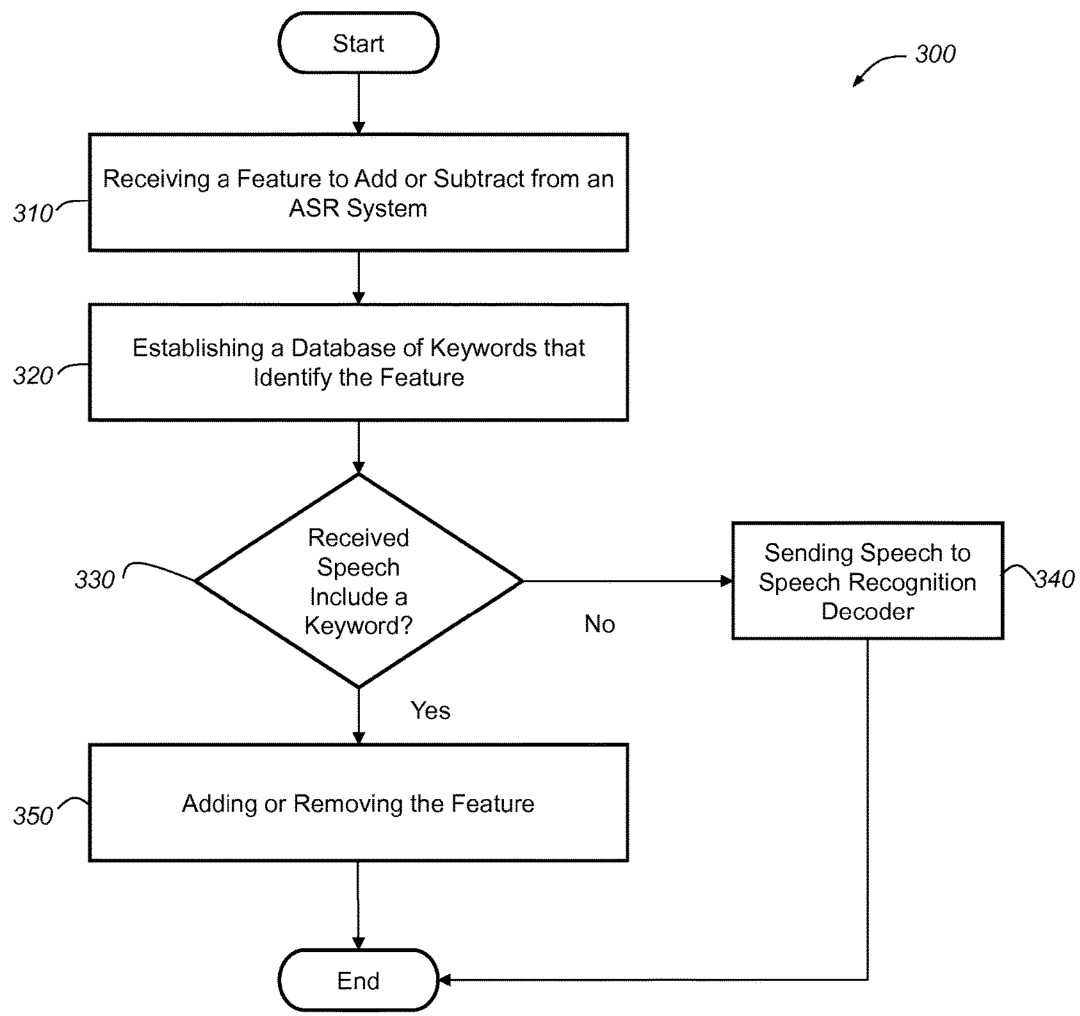
FIG. 3 is a flow chart of an embodiment of a method of modifying the existing functionality of an ASR system.

Turning now to FIG. 3, an implementation is shown of a method 300 of changing features of the ASR system 210. The method 300 begins at step 310 by receiving, at the vehicle 12, a feature to add to or remove from the ASR system 210. The vehicle 12 may be designed and equipped with the ASR system 210 configured to provide a defined number of vehicle features. For example, the vehicle 12 may be equipped to provide telephone calling features via the vehicle telematics unit 30. However, the vehicle manufacturer may later want to add navigation or turn-by-turn directions to the functionality or features offered at the vehicle 12. The vehicle manufacturer can then begin adding the navigation feature to the ASR system 210, which has already been configured in a way that does not offer the navigation feature. Or in another example, the ASR system 210 on the vehicle 12 may be configured to offer navigational directions, radio controls, in-vehicle calling, and multimedia as features that the system 210 processes using its speech recognition decoder 214. The vehicle 12 can receive a message instructing the vehicle telematics unit 30 or ASR system 210 to stop offering one or more of these features.

The identity of the feature that will be added to or removed from the ASR system 210 can be received at the vehicle 12 in different ways. For example, if the vehicle manufacturer has not yet built the vehicle 12, the vehicle manufacturer may provide the feature to be added to or removed from the ASR system 210 to the vehicle telematics unit 30 prior to installing the unit 30 in the vehicle 12. It is also possible to provide the feature to be added to or removed from the vehicle 12 to the ASR system 210 after the vehicle 12 has been built but before the vehicle 12 is sold to a vehicle owner. In this implementation, the ASR system 210 can be configured depending on the geographic area where the vehicle 12 will be sold or on the level of features that the vehicle owner desires. The vehicle 12 can receive the feature at the location where the vehicle 12 is manufactured or later after the vehicle 12 has already been sold to a vehicle owner. In the latter implementation, the vehicle 12 can receive the added/removed feature identity wirelessly via the vehicle telematics unit 30. The method 300 proceeds to step 320.

At step 320, a database of keywords that identify the feature are established at the vehicle 12. Along with the identity of the feature to be added or removed, the vehicle 12 can receive or access a database of keywords associated with the feature. The ASR system 210 can use the keywords to determine when incoming speech relates to the feature that is added or removed. Keywords such as "find," "point of interest," "POI," "locate," "directions," and "navigate" can be used to indicate that speech received from a vehicle occupant is directed to a navigation feature. Or keywords like "dial," "call," or "telephone" can indicate attempts by the vehicle occupant to place cellular calls using the vehicle telematics unit 30. Examples of keywords associated with radio features include "tune" or "station" while possible keywords for multimedia features could include "email," "compose," or "send." These keywords are merely examples of what could be included in the keyword database to identify associated features and it should be understood that other, different keywords are possible. Each keyword can be associated with one or more features in the database. For instance, using the examples above, the keyword "find" can be stored with "navigation" and the keyword "dial" can be stored with "telephone."

The database of keywords can be accessible by the pre-processor software module 212, the post-processor software module 216, or both. In some implementations, the database of keywords can be stored along with the pre-processor software module 212 or the post-processor software module 216 in the memory 54. However, in other implementations, the database of keywords can be stored separately from the software modules used to carry out the ASR system 210. At this point, the ASR system 210 is ready to add or remove features when it receives speech from a vehicle occupant. That way, the speech recognition decoder 214 of the ASR system 210 is not altered but the pre-processor software module 212, the post-processor software module 216, or both may standby to add or remove features/functionality when speech related to the added/removed features is received. The method 300 proceeds to step 330.

At step 330, speech received from a vehicle occupant is monitored for one or more of the keywords. If one of the keywords is not detected, the method proceeds to step 340 and the phonetic or acoustic frames generated by the pre-processor module 212 can be passed to the speech recognition decoder 214. The method 300 then ends. However, if one or more keywords are detected, the method 300 proceeds to step 350 and the feature associated with the detected keyword(s) is added or removed. Monitoring for the keywords can be carried out at the pre-processor software module 212. It is possible to configure the existing ASR system 210 so that its pre-processor module 212 includes a secondary speech recognition decoder 215 that transforms the acoustic subwords generated by the pre-preprocessor module 212 into a best hypothesis corresponding to the most probable utterance or subword sequence for a given observation sequence of acoustic feature vectors.

The secondary speech recognition decoder 215 can function much like the speech recognition decoder 214 to process speech. However, the secondary speech recognition decoder 215 can be provided by a vehicle manufacturer or source other than the third party who designed and/or built the ASR system 210. In that way, the secondary speech recognition decoder 215 can include its own set of grammar/lexicon models, acoustic models, word models, and/or sentence/language models, such that the secondary speech recognition decoder 215 works as a separate speech recognition system within the ASR system 210. The pre-processor software module 212 can then determine whether the content of its best hypothesis matches one or more keywords found in the database. When the pre-processor software module 212 (or the secondary speech recognition decoder 215) identifies the match, it can access the feature associated with the matching keyword. The method 300 proceeds to step 340.

At step 350, the feature is added or removed from the ASR system 210 at the pre-processing software module 212 or the post-processing software module 216. The manner in which this happens can depend based on whether a feature is added or removed from the ASR system 210. Adding and removing features to the ASR system 210 can be carried out at the pre-processing software module 212. When the pre-processing module 212, using the secondary speech recognition decoder 215, detects a keyword associated with a feature to be added, the pre-processing module 212 can route the output from the secondary speech recognition decoder 215 to the post-processing software module 216. However, when the pre-processing software module 212 and its secondary speech recognition decoder 215 detects a keyword associated with a feature to be removed, the secondary speech recognition decoder 215 can stop transmission of the speech from the pre-processing software module 212 to either the speech recognition decoder 214 or the post-processing software module 216. Along with stopping the transmission, the ASR system 210 can generate an audible message to vehicle occupants through the audio system 34 that explains how the requested feature is not available for use.

The post-processing software module 216 can be used to remove features from the ASR system 210. When either the pre-processing software module 212 or the post-processing software module 216 detects one of the keywords associated with a feature to remove, the post-processing software module 216 can be directed not to output the recognized speech. In some implementations, the pre-processing software module 212 detects a keyword associated with a feature to remove and then transmits a command to the post-processing software module 216 instructing it to not output recognized speech. In other implementations, the post-processing software module 216 can receive output from the speech recognition decoder 214 and process the output to identify keywords associated with the feature to remove. The post-processing software module 216 can access the database of keywords described above from the post-processing module 216 itself, the pre-processing software module 212, or another location.

The ASR system 210 can also periodically perform tests intended to identify the features offered at any one time. Previously-recorded speech segments that include keywords associated with each possible feature can be input into the ASR system 210. Output from the ASR system 210 can then be monitored to determine what features are or are not supported by the ASR system 210. For instance, if the ASR system 210 has been configured to provide radio and telephone features, the system 210 can be provided speech segments that include keywords associated with navigation, telephone, multimedia, and radio features. The output from the ASR system 210 should only include content related to the radio and telephone features. If the output includes content related to navigation or multimedia, the vehicle 12 can determine that the ASR system 210 is not properly excluding the navigation and/or multimedia features. The method 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of changing vehicle features of an existing automatic speech recognition (ASR) system installed in a vehicle that includes a processor, wherein the existing ASR system is configured to provide select vehicle features that are initiated by vocalized commands from a vehicle occupant, the method comprising the steps of:

(a) applying a secondary speech recognition module to the existing ASR system, wherein the secondary speech recognition module is configured to monitor speech received via a microphone from the vehicle occupant to identify one or more keywords that relate to at least one of the select vehicle features provided by the existing ASR system that is unavailable at the vehicle;

(b) detecting the one or more keywords in the monitored speech that relate to an unavailable vehicle feature using the secondary speech recognition module executed by the processor; and (c) removing the unavailable vehicle feature from the existing ASR system based on step (b) so that the existing ASR system provides a defined number of features that conform to or match the vehicle features available at the vehicle, wherein removing the unavailable vehicle feature modifies the configuration of the existing ASR system.

2. The method of claim 1, wherein step (c) is carried out at a pre-processor software module or a post-processor software module of the existing ASR system.

3. The method of claim 1, further comprising the step of storing a plurality of keywords each with a vehicle feature in a database.

4. The method of claim 1, wherein the unavailable vehicle feature comprises a navigation feature, a radio feature, a telephone feature, or a multimedia feature.

5. The method of claim 1, further comprising the step of identifying one or more vehicle features enabled by the existing ASR system by inputting speech segments into the existing ASR system that include keywords associated with the vehicle features.

6. A method of changing vehicle features of an existing automatic speech recognition (ASR) system installed in a vehicle that includes a processor, wherein the existing ASR system is configured to provide select vehicle features that are initiated by vocalized commands from a vehicle occupant, the method, comprising the steps of:

(a) applying a secondary speech recognition module to the existing ASR system, wherein the secondary speech recognition module is configured to monitor speech received from the vehicle occupant via a microphone to identify one or more keywords that relate to a vehicle feature that is not one of the select vehicle features configured by the existing ASR system;

(b) detecting the one or more keywords in the monitored speech using the secondary speech recognition module executed by the processor;

(c) adding the vehicle feature to the existing ASR system based on step (b) so that the ASR system provides a defined number of vehicle features that conform to or match the vehicle features available at the vehicle; and (d) generating a speech recognition output at the secondary speech recognition module that corresponds to the added vehicle feature, wherein adding the vehicle feature modifies the configuration of the existing ASR system.

7. The method of claim 6, further comprising the step of routing the speech recognition output to a post-processor software module.

8. The method of claim 6, further comprising the step of storing a plurality of keywords each with a vehicle feature in a database.

9. The method of claim 6, further comprising the step of receiving the vehicle feature at a vehicle telematics unit via wireless communications.

10. The method of claim 6, wherein the added vehicle feature comprises a navigation feature, a radio feature, a telephone feature, or a multimedia feature.

11. The method of claim 6, further comprising the step of identifying one or more vehicle features enabled by the ASR system by inputting speech segments into the ASR system that include keywords associated with the vehicle features.

12. A method of changing vehicle features of an existing automatic speech recognition (ASR) system that includes a processor, comprising the steps of:

(a) receiving, at a vehicle, a vehicle feature to add to or remove from the existing ASR system;

(b) establishing, at the vehicle, a database of keywords that identify the vehicle feature;

(c) applying a secondary speech recognition module to the existing ASR system, wherein the secondary speech recognition module is configured to monitor speech received from a vehicle occupant via a microphone for one or more of the keywords;

(d) detecting one or more keywords in the monitored speech using the secondary speech recognition module executed by the processor; and (e) adding or removing the vehicle feature from the existing ASR system at a pre-processor software module or a post-processor software module based on step (d) so that the existing ASR system provides a defined number of vehicle features that conform to or match the features available at a vehicle, wherein adding or removing the vehicle feature modifies the configuration of the existing ASR system.

13. The method of claim 12, wherein step (c) is carried out at the pre-processor software module of the ASR system.

14. The method of claim 12, further comprising the step of receiving the vehicle feature at a vehicle from a vehicle manufacturer before the vehicle is produced.

15. The method of claim 12, further comprising the step of receiving the vehicle feature at a vehicle telematics unit via wireless communications.

16. The method of claim 12, wherein the vehicle feature comprises a navigation feature, a radio feature, a telephone feature, or a multimedia feature.

17. The method of claim 12, further comprising the step of identifying one or more vehicle features enabled by the ASR system by inputting speech segments into the ASR system that include keywords associated with the vehicle features.

* * * * *